Patented Nov. 16, 1943

2,334,405

UNITED STATES PATENT OFFICE 2,334,405

METHOD OF MAKING DEEP-ETCHED LITHOGRAPHIC PLATES

Anthony George, Cincinnati, Ohio, assignor to The Lithographic Technical Foundation, Inc., New York, N. Y., a corporation of Delaware No Drawing. Application February 16, 1942, Serial No. 431,083

5 Claims. (Cl. 101—149.2)

This invention relates to the method of making deep-etched lithographic plates by the gum process, a method well known to the art and currently in extensive use. The invention is addressed particularly to a method of removing the aqueous deep-etching medium from the etched image areas and transforming said image areas to a state of ink-receptiveness.

In the conventional method a zinc plate, or plate of another metal, is grained, coated with a solution of bichromated gum arabic, dried, exposed to light in contact with a line or halftone positive or by projection, developed with a weakly acidified, nearly saturated aqueous alkaline earth chloride solution, and deep-etched with a more strongly acidified aqueous alkaline earth solution. At this point the plate surface is washed with anhydrous ethyl alcohol to remove the residue of deep-etching solution from the image areas, thereby rendering them receptive to hydrophobic materials such as asphaltum, lacquers, and lithographic inks.

The disadvantages of anhydrous ethyl alcohol are:

1. It is strongly hygroscopic and absorbs moisture rapidly from the atmosphere, especially in humid weather. Unless great skill and care are exercised, the moisture-diluted alcohol dissolves a portion of the gum stencil surrounding the deep-etched image areas and upon evaporation leaves a minute deposit of gum on said areas, thereby rendering them non-retentive of hydrophobic materials such as asphaltum, lacquers, and lithographic inks.

2. Ethyl alcohol evaporates so rapidly that its complete removal from the deep-etched areas without redepositing traces of constituents of the deep-etching solution, particularly hygroscopic alkaline earth chlorides, is difficult and requires great skill and care, especially in humid weather.

As a result of these disadvantages, the method of washing a deep-etched plate with anhydrous denatured alcohol has consisted in flushing the plate surface with relatively large quantities of the alcohol and removing the excess alcohol with a squeegee. This operation is repeated three or four times. In spite of this treatment, there has been a considerable percentage of failures in deep-etch plate making.

The object of this invention is to provide an improved method and material for removing the residue of deep-etching solution from the etched image areas and for transforming said image areas from water-wet surfaces to surfaces which are receptive to and retentive of asphaltum, lacquer, and lithographic ink.

I have found that furfuryl alcohol accomplishes the desired purpose by dissolving the water and alkaline earth residues from the etched image areas and leaving such areas in a condition extremely receptive to grease, asphaltum, lacquers, and lithographic ink. In accordance with the invention, therefore, furfuryl alcohol is used in place of ethyl alcohol for removing the residue of the deep-etching solution.

Furfuryl alcohol is used in substantially the same manner that ethyl alcohol has heretofore been used for the purpose except that the quantity of furfuryl alcohol employed may be considerably less. When the deep-etching of the image areas has been completed the excess of the deep-etching solution is removed with a squeegee and then a small amount of furfuryl alcohol is poured onto the plate and distributed over the image areas by rubbing with a soft cloth or wad of cotton. Then the furfuryl alcohol together with the residue of deep-etching solution dissolved with it is absorbed or blotted up. Furfuryl alcohol is applied two or three times in this manner preferably using a clean cloth or fresh cotton each time the furfuryl alcohol is to be removed from the plate. After the plate has been cleansed in this manner a thin coating of asphaltum or ink-receptive lacquer is applied to the plate. The remainder of the process is the same as that in current practice, namely, the application of a greasy developing ink and removal of the bichromated gum stencil with water.

As will readily be understood, the relatively slow evaporation rate of the furfuryl alcohol permits working a small amount of it over the plate surface, an operation that is altogether impractical with anhydrous denatured alcohol, both because of its high volatility and its hygroscopic nature. During this operation the furfuryl alcohol dissolves the residue of the deep-etching solution and is subsequently absorbed by the cloth or cotton, leaving the image areas wet with a very thin film of furfuryl alcohol. Two or three treatments in the manner described are sufficient to remove all traces of moisture, alkaline earth chlorides, acids, or other contaminants which would interfere with complete adhesion of the hydrophobic materials necessary to produce a lithographic image, namely, asphaltum, lacquer, or lithographic ink.

Having described my invention, I claim:

1. A method of making deep-etched lithographic plates comprising, coating a grained metal plate with bichromated colloid solution, drying the plate, exposing to a light image, developing to expose the metal in the printing areas, deep-etching the printing areas, applying ink or an ink-receptive substance to the image areas, and removing the bichromated gum stencil from the non-printing areas, which method is characterized by the use of furfuryl alcohol to remove residues left by the deep-etching solution on the image areas and to render these areas highly retentive of lithographic ink or of an ink-receptive substance.

2. The method of rendering a plate which has been etched and has residues of etching solution remaining thereon retentive with respect to a hydrophobic material, which comprises washing the surface of the plate with furfuryl alcohol until the residue is removed.

3. The method of removing residues of etching solution from a lithographic plate after the plate has been etched by such solution, which method comprises dissolving the residue in furfuryl alcohol and then removing the furfuryl alcohol containing the residue.

4. The method of treating a lithographic plate after it has been etched to remove residues of etching solution from the plate, which comprises washing the surface of the plate with furfuryl alcohol, removing the furfuryl alcohol after it has dissolved the residues and then treating the plate a second time with furfuryl alcohol.

5. The method of improving the ink receptivity of a deep-etched lithographic plate which has etching residues thereon, which method comprises dissolving and removing said residues with furfuryl alcohol.

ANTHONY GEORGE.